United States Patent Office 2,970,099
Patented Jan. 31, 1961

2,970,099
ALKYLATED ASPHALT COMPOSITION CONTAINING LUBRICATING OIL AND ALKYLATED ASPHALTENES

John C. Illman, El Cerrito, Calif., assignor to Shell Oil Company, a corporation of Delaware No Drawing. Filed June 26, 1958, Ser. No. 744,645

6 Claims. (Cl. 208—23)

This invention relates to an improved asphalt composition. More particularly, it relates to a composition having improved viscosity-temperature relationships, reduced bleeding tendencies, and especially improved weathering properties.

Asphalts have been divided arbitrarily with respect to their components into two general classes thereof, namely, asphaltenes and maltenes. This division is normally achieved by means of solvent fractionation. The asphaltenes constitute that portion of the asphalt which is precipitated by lower aliphatic hydrocarbons, such as gasoline or isopentane or the like. Maltenes comprise the portion fully soluble in the medium employed for asphaltene precipitation and consist of saturates, aromatics and resins. Asphaltenes are normally regarded as high molecular weight polycyclic materials containing substantial proportions of heterocyclic rings wherein nitrogen, sulfur and oxygen are present in the ring structures.

Depending upon the source and previous history of asphalts relative to their isolation and preparation, they may vary widely in their response to thermal influences with respect to changes in viscosity. Moreover, there is a wide variation in the quality of an asphalt relative to its ability to withstand the adverse effects of weathering, such as may occur when the material is employed as a shingle coating or for other types of roofing, paving and the like.

The change of viscosity with temperature should be kept within certain desired limits depending on the use to which the asphalt is to be put. The slope of the viscosity-temperature line should for many purposes be kept as flat as possible so as to maintain a relatively narrow range of viscosity difference upon changes in the temperature of the asphalt composition. For example, paving asphalts must not be too fluid at the high temperatures at which they are mixed with aggregate and applied to the road, yet must not harden so much as to become brittle at low ambient temperatures. Roofing asphalts must be even less temperature susceptible, and must not slump or flow at high ambient temperatures, nor be brittle at low temperatures. Likewise, it is necessary for an asphalt to withstand the adverse effects of weathering to a substantial extent if the material is to be employed for roofing or coating purposes. For example, it should not exhibit any abnormal tendency to form cracks or pin holes in the coating if it is to be employed for these purposes.

Dependent upon either the source of the crude from which asphalt is produced or upon processing procedures within the refinery, some asphalts are available in limited quantities having one or another of the properties discussed above. However, the quantity of such asphalts is strictly limited and in fact appears to be diminishing as the most desirable types of crudes are consumed. Furthermore, the extent to which asphalt can perform with respect to temperature response, weathering or bleeding appears to be limited and no one asphalt produced today is fully satisfactory in all of these respects.

It is an object of the present invention to provide an asphalt composition having improved compatability of the several asphalt components, namely, of asphaltenes with maltenes of high saturate content or of low carbon to hydrogen ratio.

It is a further object of the invention to provide an asphalt composition having improved viscosity-temperature relationships.

It is a special object of this invention to provide asphalt compositions having outstanding weathering characteristics.

Other objects will become apparent during the following description of the invention.

Now, in accordance with the present invention it has been found that the weatherability, viscosity-temperature slope and sweating tendencies of asphalt compositions are improved to an unexpected degree if the asphaltenes are alkylated with 1–20 alkyl radicals per molecule having 16–40 (preferably 16–30) carbon atoms each, the carbon-to-hydrogen atomic ratio of the alkylated asphaltenes being between about 0.72 and about 0.84. Since asphaltenes having this combination of physical constants which results in the above improvements in physical properties do not occur in asphalts produced by simple distillation or blowing operations, but must be produced synthetically, the asphaltenes per se are regarded as novel.

Still in accordance with this invention, the air blowing (or other oxidation) of asphalts containing said alkylated asphaltenes results in oxidized asphalts having superior properties, especially as roofing compositions.

A preferred aspect of the present invention comprises the unaccountable increase in molecular weight which occurs when such alkylated asphaltenes are subjected to oxidation (air blowing) as compared with the increase in molecular weight which occurs when ordinary asphaltenes, not having the above-recited combination of physical constants, are oxidized.

The type of asphalt to which the present invention particularly applies is not critical other than that the asphalt should contain a sufficient amount of asphaltene components to be substantially altered in the presence of an alkylating agent. Hence, the well-known varieties of straight run, blown or cracked asphalts as well as mixtures thereof may be employed. Paving grade, coating grade, saturant grade and softer asphalts may be utilized in the process under consideration as well as mixtures of the same. Preferably, the asphaltene components of these asphalts as obtained by the usual refinery processes are concentrated or isolated from the other non-asphaltene components of the asphalt prior to alkylation. Asphaltenes showing the most favorable response to the process comprise those of highly aromatic character containing few or short side chains. Economically, of course, it is preferable to employ an asphalt having at least 5% by weight of asphaltenes and preferably more than about 20% by weight of asphaltenes so as to have a minimum of maltene fractions and a maximum sensitive asphaltene fraction most capable of alkylation.

One aspect of the invention comprises alkylation of maltenes or aromatic petroleum fractions having molecular weights above 400 and thereafter oxidizing (air blowing) the alkylated product to convert a portion thereof to asphaltenes. Hence, the present process will be understood to apply not only to hard asphalts, i.e. those having penetrations from 0 to 10 (ASTM Method D–5–25, 77° F., 100 gram load, 5 seconds), but also other relatively softer asphaltic residues, preferably having a maximum of about 200 penetration and such materials as residual industrial fuel oils having viscosities in the order of about 45–300 SSF at 122° F. In addition to having such penetration characteristics, the asphalts will generally have softening points between about 70° F. and 350° F. They include straight run asphalts, steam distilled asphalts, blown asphalts, solvent refined asphalts, cracked asphalts, vacuum flashed asphalts and similar asphaltic residues as well as native asphalts and asphaltites, all of which preferably comprise at least about 5% by weight of asphaltenes.

The term "asphaltenes" is defined in Abraham, Fifth Edition, of "Asphalts and Allied Substances" on pages 1165–6 as being the non-mineral constituents remaining insoluble in petroleum naphtha, thus differentiating them from the maltenes (petrolenes) which dissolve in the same medium and under the same conditions. As the test is made at room temperature (65–75° F.), this latter would constitute a further limitation. A still further limitation would comprise the proportion of petroleum naphtha employed for the purpose of causing the separation. According to the standardized method, 50 volumes of petroleum naphtha are employed, the test temperature normally being ambient (room) temperature. While this standard procedure defines the term, it will be understood that the asphaltic fraction insoluble at room temperature in any aliphatic hydrocarbon having 5–12 carbon atoms per molecule may be regarded as "asphaltene" for the present invention.

The asphalts may be introduced into the aliphatic hydrocarbon precipitant ($C_{5-12}$ alkanes) by several alternative means, dependent upon their physical characteristics. For example, hard asphalts (especially cracked or blown) i.e. those having a penetration at 77° F. less than about 10 are preferably introduced by first dissolving them in a minimum amount of aromatic hydrocarbon solvent. In order to minimize the effect of the solvent upon the precipitation of the asphaltene, it is preferred that the proportion of solvent be restricted to between about 0.5 and 2 volumes for each volume of the asphaltic residue. The aromatic solvent is preferably one predominating in aromatic hydrocarbons having less than 10 carbon atoms per molecule, of which benzene and toluene are suitable members. Preferably, the aromatic solvent contains at least about 70% by weight of such aromatic hydrocarbons and more desirably contained 85% or more of such hydrocarbons. The solution may take place at room temperature or, preferably, at reflux temperature in order to hasten the process. Softer asphalts, i.e. those having penetrations greater than about 10 at 77° F. may be dispersed sufficiently for the present purpose by refluxing in the presence of a limited proportion of the precipitating aliphatic hydrocarbon, although the aromatic solvent may be used in addition to or in place of the aliphatic medium. The proportion again is preferably limited to between about 0.5 and 2 volumes of the refluxing medium for each volume of the asphalt, regardless of whether or not the refluxing medium comprises entirely aliphatic hydrocarbons having 5–12 carbon atoms per molecule or additionally contains aromatic hydrocarbons as well.

The maltene solution and the precipitated particles are separated by any suitable means including filtration, centrifuging, sedimentation, decanting or similar treatment. Following separation of the asphaltene particles they are then suspended in the alkylating agent which should be fluid at the handling temperatures and subjected to alkylation. As stated hereinbefore, of course, it is possible to alkylate full asphalts without previous fractionation to concentrate or isolate the asphaltene portion thereof.

Alkylation of asphaltenes may be effected by free radical mechanisms. The most favorable conditions are found in the use of ionizing radiation, preferably by means of the Van de Graaff or linear accelerators. Other free radical transformations may be performed by the use of high energy photons, such as are produced by X-rays or gamma rays which may be produced by decay of radioactive materials, such as cobalt 60, cesium 137, etc. The sources of radiant energy which do not emit neutrons are preferred since the formation of radioactive by-products, such as radioactive sulfur, nitrogen and carbon, is minimized. However, for many purposes where radioactive asphaltenes are not objectionable, the use of neutron sources, such as nuclear reactors or spent fuel elements for the same, may be utilized in the radiation of asphaltenes.

Other free radical transformations may be employed, such the use of peroxides as catalysts for the alkylation, dialkyl peroxides, such as ditertiary butyl peroxide, being preferred.

When using an energy source such as a Van de Graaff accelerator; temperatures in the order of 50–250° C. are employed dependent in part upon the viscosity of the asphalt being so treated. It is preferred to maintain the temperature such that easy stirring is possible and that the solution of asphalt or asphaltene in the alkylating agent be stirred continuously during the irradiation period. The extent of radiation should be from $10^7$ to $10^{10}$ rads, a rad being defined as 100 ergs of ionizing energy per gram of irradiated mixture.

The time of exposure of the asphaltene and alkylating agent mixture to radiation is a function of the intensity of radiation employed, the geometry of the reaction zone, and the desired degree of conversion. When utilizing an ionizing radiation source, such as waste fission products from a nuclear reactor and temperatures between about 10° C. and 250° C., the time of exposure to such ionizing radiation as is normally produced therein is preferably between about 50 hours and about 500 hours.

Alkylating agents include particularly alkyl halides, alkenes and alkanes, all of which should contain alkyl radicals having from 16 to 40 carbon atoms per molecule and preferably between about 16 and 30 carbon atoms per molecule. Maximum beneficial effects are obtained by radiation of a mixture comprising asphaltenes and alkylating agents producing a preponderance of alkyl radicals having from 16 to 24 carbon atoms per molecule, the alkylation being carried out to an extent sufficient to incorporate from 1 to 20 alkyl chains of such length per molecule of asphaltenes. It is preferred that the alkyl radical be substantially straight chained, that is, containing no more than methyl side chains and that there be no more than 6 methyl groups per alkyl radical. Wax-containing asphalts may be irradiated, the waxes in this case constituting the alkylation agent. It is preferred practice to mix 0.1–5 volumes of alkylating agent with 1 volume of asphalt or asphaltenes.

Suitable alkylating agents include especially the normal alkanes, such as cetane, octadecane, eicosane, etc. and methyl-branched alkanes, such as 1,4-dimethyl hexadecane, 1,4,8-trimethyl octadecane, and other methyl substituted alkanes, such as squalane. The corresponding olefinic materials may be utilized. The corresponding alkyl halides, particularly the alkyl chlorides, may be employed for this purpose.

When utilizing alkylation environments other than ionizing radiation, a suitable catalyzed alkylation may be effected by the use of dialkyl peroxides, such as ditertiary-butyl peroxide. Under these conditions, the asphaltene is mixed with an alkylating agent, such as the alkanes previously described and the peroxide, the latter being present in an amount between about 1% and about 20% of the total reaction mixture, while the alkylating agent is present in an amount between about 10% and 75% by weight of the total reaction mixture. The latter is preferably heated at a temperature between about 100 and 250° C. for a period between about 0.5 and 8 hours. Under these conditions, substantial alkylation of the asphaltenes occurs.

Following exposure of the asphaltenes to alkylation, the product is separated into alkylated asphaltene-containing material and unreacted low molecular weight alkylating agents. Dependent upon whether or not the whole asphalt was subjected to alkylation, one subsequent step in the utilization of the alkylated asphaltenes comprises combination with other materials for use as roofing compounds, saturants for roofing felts, coating compounds or paving grade asphalts. The materials utilized for this purpose in each of the several end uses are well known in the art and do not constitute a part of the present invention. In accordance with one aspect of the invention wherein asphaltenes were alkylated in the substantial absence of non-asphaltene components of asphalts, the product after separation from the alkylating agents may be combined with maltenes (either natural or synthetic) in such proportions as to reconstitute a commercial grade asphalt. Of course, maltenes or a non-alkylated asphalt can be added to an alkylated product irrespective of whether or not the alkylated product was an asphalt or just the asphaltene portion thereof. Radiation not only causes alkylation of the asphaltenes by radicals from the alkylating agent but also may effect an indeterminate amount of polymerization of the asphaltenes, either through coupling of the asphaltene aromatic nuclei or within or between alkyl radicals which become attached to the asphaltene nuclei.

One of the striking and beneficial effects of the present invention comprises the reduced temperature susceptibility caused by the alkylation. This improvement in the viscosity-temperature slope is an important technical advance highly desirable for many purposes. For example, in paving grade asphalt, it is to be desired that the temperature susceptibility of the composition be below certain limits so as to minimize differences in consistency of a road during both hot and cold weather.

An additional advantage of substantial economic importance comprises the improvement in weatherability of asphalt compositions wherein the asphaltenes have been subjected to alkylation. The working examples given hereinafter demonstrates this beneficial feature. The implications of this improvement are that asphalts so treated will withstand the adverse effects of exposure to weather as experienced in commercial end uses such as roofing or paving grade asphalts and the like to a much greater degree than if the asphaltenes have not been alkylated.

The following examples illustrate the benefits to be obtained by the use of the present invention.

EXAMPLE I

The asphalt employed for this test was the residue from the distillation of a California San Joaquin Valley crude and had the following properties:

Penetration at 77° F., 100 g., 5 sec., dmm., 35
Softening point (ring and ball), ° F., 124

The asphalt was dissolved in an equal weight of cetane and irradiated with an electron beam in a Van de Graaff accelerator at a temperature of 150–200° C. to a radiation dosage of $1.2 \times 10^9$ rads. The product was separated from unreacted cetane and the asphaltenes precipitated from the product by means of isopentane. Table I presents comparative data showing the properties of the irradiated asphalt and those of the original asphalt, as well as the original and irradiated products which have been blown with air at a temperature of about 250° C. for a period of about 3–15 hours.

Table I

| Asphalt | Penetration at 77° F. | Softening Point, ° F. | Atomic C/H Ratio | Percent Asphaltenes | Atomic C/H Ratio of Asphaltene | Mol. wt. of Asphaltene [2] |
|---|---|---|---|---|---|---|
| Original | 35 | 124 | 0.70 | 14 | 0.91 | 2,000 |
| Irradiated | [1] 104 | [1] 111 | 0.67 | 12 | 0.83 | 3,700 |
| Air Blown Original | 1 | 205 | | 41.5 | 0.89 | 2,700 |
| Air Blown Irradiated | 4 | 201 | | 40.0 | 0.83 | 5,500 |

[1] May contain a trace of unreacted cetane.
[2] By ebullioscopic method in benzene.

The asphaltenes precipitated from the original asphalt and also from the irradiated asphalt were mixed with squalane to determine the compatibility therewith. It was found that the original asphaltenes were compatible at room temperature with 22% by weight of squalane while the asphaltenes from the irradiated asphalt were much more compatible with squalane, forming a homogeneous mixture with 33% by weight of squalane.

Compositions were prepared by blending approximately equal quantities of the asphaltenes from the blown original asphalt or from the blown irradiated asphalt with an industrial lubricating oil raffinate. The compositions so obtained had approximately the same penetration and softening point and were spread on panels and subjected to weatherometer testing. The composition containing the blown original asphalt failed after one cycle while the blown irradiated asphalt composition did not fail until 22 cycles in the weatherometer test machine.

The squalane tolerance is performed under standard conditions as an indication of the compatibility of alkylated asphaltenes (or of asphaltenes before alkylation) with compounds of more aliphatic character, such as may occur in maltenes. In order to perform the squalane tolerance test, the asphaltene and squalane are heated to 200° C. and a drop of the resulting solution placed on a microscope slide, and pressed into a thin film. After cooling to room temperature the slide is examined under a 400 power microscope to determine whether or not demixing has occurred with the specific quantity of squalane utilized. Samples containing different proportions of squalane are examined to estimate the maximum amount thereof which may be mixed with the asphaltene before demixing occurs.

EXAMPLE II

A sample was prepared by precipitation of the asphaltenes from a California San Joaquin Valley asphalt by means of excess isopentane. This product was irradiated in a Van de Graaff accelerator in the presence of 3 weights of cetane per weight of asphaltene to a dosage of $1.2 \times 10^9$ rads. The material so treated was found to have a substantially greater compatibility with squalane (as a typical isoparaffin), 39 parts by weight of the irradiated asphaltenes being compatible with 61 parts by weight of squalane.

EXAMPLE III

The product obtained in Example I above was tested for viscosity over a temperature range and compared with the viscosity of the original non-irradiated asphalt.

Table II

| Asphalt | Viscosity, cs. | | | Viscosity, Temperature Slope [1] |
|---|---|---|---|---|
| | 39.2° F. | 77° F. | 140° F. | |
| Original | $3.9 \times 10^{11}$ | $4.98 \times 10^8$ | $2.93 \times 10^5$ | −4.18 |
| Irradiated | $2.6 \times 10^{11}$ | $7.50 \times 10^8$ | $6.36 \times 10^5$ | −3.82 |

[1] $\dfrac{\log \log vis_{77} - \log \log vis_{140}}{\log(77+460) - \log(140+460)}$

EXAMPLE IV

Table III which follows shows the effect upon asphaltenes from various sources of alkylation with cetane. It will be seen that in each case the squalane tolerance was substantially raised while the carbon-to-hydrogen ratio was decreased. Simultaneously, the molecular weight of the asphaltenes was substantially increased over that of the unalkylated asphaltenes.

Table III

ALKYLATION OF VARIOUS ASPHALTENES WITH CETANE

| Asphaltene Source | San Joaquin Valley Crude | | LA Basin Crude, Thermally Cracked | | Mid-Continent Crude | |
|---|---|---|---|---|---|---|
| Asphaltene/Cetane Ratio | 25/75 | | 30/70 | | 30/70 | | 30/70 |
| Radiation Dosage, Rads | $1.2 \times 10^9$ | | $1.2 \times 10^9$ | | $1.2 \times 10^9$ | | $9 \times 10^8$ |
| Temperature, °C | 190 | | 235 | | 195 | | 210 |
| Cetane Reacted, g./100 g. Asphaltene | 71–76 | | 52 | | 73 | | 60 |
| Cetane Reacted, moles cetane/mole of Asphaltene | 6–7 | | 4.1 | | 6.4 | | 9 |
| Asphaltene Yield, g./g. Orig. | 1.01 | | 1.04 | | 1.07 | | 0.96 |
| | Orig. | Alkylated | Orig. | Alkylated | Orig. | Alkylated |
| Asphaltene Props.: | | | | | | |
| Mol Weight | 1,600 | 10,300  9,000 | 1,970 | Partially Insol. | 3,400 | Partially Insol. |
| C/H Ratio | 0.91 | 0.77  0.79 | 1.01 (24) | 0.84 Insol. | 0.85 | 0.75. |
| Squalane Tolerance, percent | 20 | 61  57 | | Insol. | 53 | 70. |

EXAMPLE V

Table IV which follows shows the effect of chain length and of a limited degree of branching upon the properties of alkylated asphaltenes. It will be noted that the asphaltenes were from a single source and were alkylated to approximately the same carbon-to-hydrogen ratio. It is noteworthy that relatively short alkyl radicals improved the squalane tolerance only to a limited degree, but that when the alkyl radicals were within the range claimed in the present invention a substantial improvement in squalane tolerance occurred.

Table IV

ALKYLATION OF ASPHALTENES FROM SAN JOAQUIN VALLEY ASPHALT WITH VARIOUS SATURATES

| Saturate | Original | n-Decane | Cetane | Paraffin Wax [1] | Squalane |
|---|---|---|---|---|---|
| Asphaltene/Saturate Ratio | | 30/70 | 30/70 | 30/70 | 30/70 |
| Radiation Dosage, Rads | | $1.2 \times 10^9$ | $1.2 \times 10^9$ | $1.2 \times 10^9$ | $1.2 \times 10^9$ |
| Temperature, °C | | 100–130 | 235 | 188 | 190 |
| Saturate Reacted, g./100 g. Asphaltene | | ca 50 | 52 | 78 | 85 |
| Saturate Reacted, moles/mole | | 5.5–6 | 4.1 | 4.5 | 4 |
| Asphaltene Yield, g./g. orig. | | 1.1 | 1.04 | 0.89 | 0.85 |
| Asphaltene Properties: | | | | | |
| Mol Weight | 1,600 | 7,000 | 9,000 | 9,000 | 5,600 |
| C/H Ratio | 0.91 | 0.78 | 0.79 | 0.76 | 0.81 |
| Squalane Tolerance, percent | 20 | 45 | 57 | 67 | 56 |

[1] Ca 80–90% n-paraffins, average carbon atoms per molecule about 25.

EXAMPLE VI

Table V which follows shows the effect of the degree of alkylation upon the squalane tolerance of the alkylated product. It will be noted that as the number of $C_{16}$ alkyl side chains is increased from 0 to 5.5, the squalane tolerance rises sharply fromb 20% to 69%.

Table V

EFFECT OF DEGREE OF ALKYLATION OF SAN JOAQUIN VALLEY ASPHALTENES WITH CETANE

| | | | | |
|---|---|---|---|---|
| Radiation Dosage, Rads | None | $6 \times 10^8$ | $1.2 \times 10^9$ | $1.7 \times 10^9$ |
| Asphaltene/Cetane Ratio | | 30/70 | 30/70 | 30/70 |
| Temperature, °C | | 190 | 235 | 190–240 |
| Cetane Reacted, g./100 g. Asphaltene | | 33 | 52 | 74 |
| Moles/Mole Asphaltene | | 2.5 | 4.1 | 5.5 |
| Asphaltene Yield, g./g. Original | | .93 | 1.04 | 1.11 |
| Asphaltene Properties: | | | | |
| Mol Weight | 1,600 | 4,700 | 9,000 | Partly Insol. |
| C/H Ratio | 0.91 | 0.84 | 0.79 | 0.74 |
| Squalane Tolerance, percent | 20 | 37 | 57 | 69 |

EXAMPLE VII

Table VI gives data demonstrating the remarkable improvement by alkylation of asphaltenes, insofar as the effect upon weatherability of asphalts made therefrom is concerned. The weatherometer test comprises repeated cycles of the following conditions: 1 hour water spray; 1.5 hours light (panel block body temperature, 140–180° F.); 2 hours water spray; 16.5 hours light; and 1.5 hours in cold chest at −10° F. Failure is indicated by the appearance of about 3 cracks or holes as detected by a high voltage spark gap instrument. One of three flux oils was chosen, as indicated by Table VI, selection being made on the basis of the best compatibility with the asphaltene concerned and on obtaining blends of the desired penetration and softening point. It will be noted that outstanding results were obtained with asphaltenes alkylated with cetane or with paraffin wax averaging $C_{25}$; and that decane-alkylated asphaltenes resulted in only a limited improvement over the unalkylated material.

Table VI
WEATHEROMETER TESTING OF BLENDED COATING-GRADE ASPHALTS

| Asphaltene Source | Percent w. | Industrial Raffinate ex PC[a], 100 sus at 210° F., Bulk Distillate, percent w. | Reclaimed Crankcase Drainings, percent w. | Heavy Lube Extract, percent w. | Penetration at 77° F. | Softening Point, ° F. | Weatherometer Test Cycles to Failure | |
|---|---|---|---|---|---|---|---|---|
| | | | | | | | Room Temp. | −10° F. |
| Blown Asphalt [a] | 48 | 41.6 | 10.4 | | 13 | 212 | 8 | 1 |
| Blown Irrad. Asphalt/Cetane | 50 | 50 | | | 14 | 206 | 34 | 22 |
| Do | 50 | 50 | | | 17 | 209 | 18 | 16 |
| Irrad. PC Asphaltene/Cetane 6×10⁸ rads | 54 | 13.8 | 32.2 | | 15 | 205 | 2 | 1 |
| Irrad. PC Asphaltene/Cetane 1.2×10⁹ rads | 50 | 40 | | 10 | 21 | 208 | 100 | 99 |
| Irrad. PC Asphaltene/Cetane 1.7×10⁹ rads | 43 | 22.8 | | 34.2 | 21 | 204 | 82 | 81 |
| Irrad. PC Asphaltene/Decane | 52 | 28.8 | 19.2 | | 20 | 203 | 13 | 12 |
| Do | 52 | 24 | 24 | | 16 | 219 | 3 | 2 |
| Irrad. PC Asphaltene/Squalane | 49 | 51 | | | 20 | 208 | 32 | 31 |
| Irrad. PC Asphaltene/C₂₅ Wax | 51 | 39.2 | | 9.8 | 21 | 212 | 98+ | 98 |
| L.A. Basin Flash Cracked | 37 | 44.1 | | 18.9 | 20 | 219 | 7 | 1 |
| Irrad. L.A. Basin/Cetane | 50 | 35 | | 15 | 17 | 222 | 34 | 28 |
| Mid-Continent [b] Semi-blown | 56 | 44 | | | 15 | 213 | 18 | 16 |
| Irrad. Mid-Continent/Cetane | 40 | 12 | | 48 | 20 | 219 | 31 | 28 |

[a] From San Joaquin Valley Crude.
[b] Roll roofing saturant—commercially sold.

EXAMPLE VIII

Alkylation of asphaltenes was effected by mixing 30 parts of asphaltenes with 66.5 parts by weight of cetane together with 8.4 parts by weight of ditertiary butyl peroxide. The mixture was heated in an autoclave for 1.5 hours at 170° C. The starting material had the following properties: C/H ratio=0.91, molecular weight 1525 and squalane tolerance 20%. The product which was isolated from the alkylation mixture had the following properties: C/H ratio 0.89, molecular weight 4200 and squalane tolerance 30%. A second experiment using an increased peroxide concentration and reaction temperature resulted in asphaltenes having a C/H ratio of 0.84. Four moles of cetane were consumed for each mole of asphaltene.

This is a continuation-in-part of copending application Serial No. 683,250, filed September 11, 1957.

I claim as my invention:

1. As a new composition of matter an asphalt comprising 5 to 50% by weight of an asphaltene fraction having a carbon-to-hydrogen atomic ratio between about 0.72 and about 0.84, said asphaltene being alkylated with 1–20 alkyl radicals per molecule, each alkyl radical having 16–40 carbon atoms and 95–50% by weight of non-asphalenic petroleum components having a boiling range at least as high as petroleum lubricating oil.

2. A composition according to claim 1 wherein the asphalt is air-blown.

3. A composition according to claim 1 wherein the asphaltene fraction has an average molecular weight between about 2500 and about 10,000 as determined ebullioscopically in benzene.

4. A composition according to claim 2 wherein the asphaltene fraction has an average molecular weight between about 4500 and about 10,000.

5. An alkylated asphaltene having a carbon-to-hydrogen atomic ratio between about 0.72 and about 0.84, said asphaltene being alkylated with 1–20 alkyl radicals per molecule, each alkyl radical having 16–40 carbon atoms.

6. As a new composition of matter a roofing asphalt composition comprising 25–75 parts by weight of a mineral lubricating oil fraction and 75–25 parts by weight of alkylated asphaltenes according to claim 5.

References Cited in the file of this patent
UNITED STATES PATENTS

| | | |
|---|---|---|
| 2,131,205 | Wells et al. | Sept. 27, 1938 |
| 2,247,375 | Hersberger | July 1, 1941 |
| 2,327,247 | Carr et al. | Aug. 17, 1943 |
| 2,383,769 | Caplan | Aug. 28, 1945 |

FOREIGN PATENTS

| | | |
|---|---|---|
| 1,148,720 | France | June 24, 1957 |

OTHER REFERENCES

Hoiberg et al.: Chem. and Eng. News; page 1990, April 23, 1956.